United States Patent Office 3,507,825
Patented Apr. 21, 1970

3,507,825
CHLOROPRENE-SULFUR COPOLYMERS HAVING IMPROVED FLEX RESISTANCE THROUGH USE OF ORGANIC SULFIDES
Jean Philip Paris, Wilmington, Del., assignor to E. I. du Pont de Nemours and Company, Wilmington, Del., a corporation of Delaware
No Drawing. Filed Aug. 24, 1967, Ser. No. 662,861
Int. Cl. C08g *51/58;* C08f *27/06*
U.S. Cl. 260—45.9      5 Claims

ABSTRACT OF THE DISCLOSURE

The present invention relates to (1) a sulfur-modified chloroprene polymer prepared by polymerizing in the presence of a dialkyl xanthogen disulfide, and having added thereto an amine or phenolic antioxidant and (2) a diaryl disulfide, the resulting cured polymer product having a significantly improved flex resistance property.

BACKGROUND

The synthetic rubbers comprising polymers and copolymers of chloroprene are widely used in applications where good resistance to chemical and thermal degradation is necessary. An especially important field of use for these polymers is in elastomeric articles that must withstand constant flexing, often at high temperatures. Examples of such elastomeric articles are automotive and industrial V-belts, conveyor belts, air springs, and blocks for machines and engines of various kinds. During extreme flexural stress most elastomers have a tendency to develop cracks that grow larger during the flexing process and eventually lead to failure of the elastomer. While chloroprene polymers generally perform well in this regard in comparison with other unsaturated elastomers, it is highly important to increase their resistance to crack formation during stressing. Such resistance to formation of cracks during flexing will hereafter, for convenience, be called "flex resistance."

A chloroprene polymer of outstanding performance is disclosed in British patent specification 1,044,847. It is the object of this invention to improve still further the properties of this remarkable product.

DESCRIPTION OF INVENTION

The said invention polymer product of British Patent 1,044,847 is prepared by polymerizing chloroprene in aqueous emulsion in the presence of (1) from 0.25 to 0.45% (expressed as percentage of monomer weight) of sulfur, and
(2) from 0.25 to 0.45% (expressed as percentage of monomer weight) of diethyl xanthogen disulfide or an amount of another dialkyl xanthogen disulfide in which the alkyl groups contain up to 8 carbon atoms and which gives an equivalent viscosity effect (as herein defined) to the said amount of diethyl xanthogen disulfide, and adding to the resulting latex a phenolic of aromatic secondary amino antioxidant in an amount of at least 0.25% based on the weight of the polymer.

Up to about 50% by weight of the chloroprene monomer can be replaced with another monomer containing olefinic unsaturation which is copolymerizable with the chloroprene, including compounds containing the group

for example aromatic compounds such as styrene, vinyl toluenes and vinyl naphthalenes, acrylic and methacrylic acids and derivatives thereof such as esters and nitriles, e.g. methyl methacrylate and acrylonitrile, and conjugated diolefinic compounds such as 1,3-butadiene, isoprene and 2,3-dichloro-1,3-butadiene. Throughout this specification and claims the term "monomer" refers to the total organic monomer used, and does not include the sulfur. Suitable antioxidants include N-phenyl-1-naphthylamine, N-phenyl-2-naphthylamine, N,N'-diphenyl-p-phenylenediamine, alkylated diphenylamines, such as octylated or nonylated diphenylamines, p-iso-propoxydiphenylamine, di-2-naphthyl-p-phenylenediamine, N-phenyl-N'-(p - toluenesulfonyl) - p - phenylenediamine, 2,2'-methylenebis(6-tert-butyl-p-cresol), 2,2'-methylenebis(6-tert-butyl-4-ethylphenol), 4,4'-butylidenebis(6-tert-butyl-p-cresol), 2,2'-methylenebis[6-(1-methyl - cyclohexyl)-p-cresol], 2,6-di-tert-butyl - 4 - phenylphenol, 4,4'-thiobis(6-tert-butyl-m-cresol), 4,4'-thiobis(3,6-di-sec-amylphenol), 2,2'-thiobis-(6-tert-butyl-p-cresol), 2,2' - thiobis-(4,6-di-tert-butylphenol), 2,5-di-tert-amyl-hydroquinone, 4-benzyloxyphenol, p-lauroyl - aminophenol, p-stearoylaminophenol, 2,6-di-tert-butyl-α-dimethylamino-p-cresol, 2,4,6-tris-(3,5-di-tert-butyl-4-hydroxybenzyl)mesitylene and 2,4,6-tris(dimethylaminomethyl)phenol. The preferred amount of antioxidant is 0.5 to 1 part, per 100 parts of polymer, and there is usually no advantage in adding more than 2 parts. While the short-stopping system normally contains a small amount of an antioxidant, this is not sufficient to stabilize the viscosity of the isolated polymer.

PRIOR ART

The process of British Patent 1,044,847, makes it possible to prepare an exceptionally stable, sulfur-modified, chloroprene polymer containing no peptizing agent. It is therefore very surprising that the addition of a small amount of diaryl disulfide, a known class of peptizing agents for sulfur-modified chloroprene polymers, will result in a product whose vulcanizates possess greatly improved flex resistance and which, at the same time, show no significant impairment of other properties such as tensile strength, and modulus. Also, the unvulcanized polymers to which the aryl disulfide has been added show no appreciable increase of scorchiness or instability with respect to changes in viscosity.

The amount of the aryl disulfide to be added ranges from about 0.001 mole to about 0.0046 mole per 100 parts of polymer. If less than 0.001 mole is added, the effect on flex resistance is not significant. More than 0.0046 mole will reduce the modulus and tensile strength of the final vulcanizates to an undesirable degree. The preferred amount is about 0.0015 to about 0.003 mole. This corresponds, for example, to about 0.41 to 0.82 part by weight of xylyl disulfide per 100 parts of polymer. It is to be understood that, in calculating moles of the disulfide, the molecular weight used is in the same weight units as the parts by weight of the chloroprene polymer.

The diaryl disulfides that are added in the practice of this invention have the general formula

R—S—S—R′ wherein R and R′ represent aromatic radicals. Examples of suitable aromatic radicals, which may be the same or different, include phenyl, tolyl, xylyl, naphthyl, and 2 - benzamidophenyl. The preferred aryl disulfides are those in which the aryl radicals are phenyl or phenyl radicals substituted with lower alkyl groups. Mixed aryl disulfides may also be used.

The aryl disulfides may be incorporated into the polymers at any time prior to vulcanization. For example, they may be dispersed in the latex prior to polymer isolation or they may be incorporated by standard compounding techniques after polymer isolation.

The compositions of this invention are highly useful materials. They may be compounded, fabricated, and cured following the procedures customarily used in handling polychloroprene elastomers. Such procedures are described, for example, in British patent specification 1,044,847. It is customary to include an antioxidant in all compounding recipes used with polychloroprene elastomers, and the addition of the antioxidant is of particular importance when using the compositions of this invention in order to obtain maximum flex resistance. Typical phenolic and amine antioxidants that may be utilized are disclosed in lines 44–64 of page 2 of British Patent 1,044,-847; one to two parts, per 100 parts of polymer is the preferred amount to add to the compounding recipe.

A representative example further illustrating the present invention follows.

EXAMPLE 1

In this example, the chloroprene polymer used corresponds to Polymer 1B of Example 1 of British patent specification 1,044,847. This polymer is prepared from an emulsion as the following recipe:

|  | Parts |
|---|---|
| Chloroprene | 98 |
| 2,3-dichloro-1,3-butadiene | 2 |
| Sulfur | 0.4 |
| Rosin | 4 |
| Diethyl xanthogen disulfied | 0.38 |
| Water | 115.5 |
| Sodium hydroxide | 0.75 |
| Sodium salt of condensate of formaldehyde and naphthalene-sulfonic acid | 0.5 |

The polymerization is carried out at 40° C. under nitrogen using, as catalyst, an aqueous solution of 5% potassium persulate and 0.125% of sodium 2-anthraquinone sulfonate, to 85% monomer conversion, being arrested by adding an emulsion containing 0.017 part each of 4-t-butyl-catechol and phenolthiazine and 0.5 part of 2,6-di-t-butyl - 4 - phenylphenol as antioxidant. The unreacted monomer is removed by turbannular steam stripping as described in U.S. Patents 2,467,769, the latex acidified with acetic acid to a pH of 5.5–6, and the polymer isolated on a freeze roll as described in U.S. Patent 2,187,146.

Samples are prepared using the following compounding recipe:

| | Parts by weight |
|---|---|
| Polymer | 100 |
| Stearic acid | 0.5 |
| N-phenyl-1-naphthylamine | 0.5 |
| Extra light calcined magnesia | 2 |
| Semi-reinforcing furnace black | 29 |
| Zinc oxide | 5 |
| Tetraethyl thiuram disulfide | 1.25 |
| Diphenylguanidine | 0.25 |
| Disulfide, as shown in Table I. | |

The vulcanization is carried out in molds under pressure for 25 minutes at 152° C. The test is carried out using ASTM Method D–813–59. Testing is carried out at 100° C. to show the effect of the additive on flex resistance of the polymer at high temperatures. A stroke of ¾ inch is used on the testing machine. Flex resistance is determined by the number of flexes required to cause a 0.1 inch crack growth in the pierced specimen.

The following aryl disulfides are used:

| Run | | Parts | Moles |
|---|---|---|---|
| A | Phenyl disulfide | 0.5 | 0.0023 |
| B | Mixture of isomeric xylyl disulfides [1] | 0.5 | 0.0018 |
| C | do [1] | 1.0 | 0.0036 |
| D | Bis(2-benzamidophenyl) disulfide | 0.5 | 0.0011 |
| E | do | 1.0 | 0.0022 |
| F | None (control) | 0 | 0 |

[1] A mixture of isomeric xylyl disulfides used as a 50% solution in kerosene. Parts and number of moles refers to the xylyl disulfide. It is prepared by reacting xylene with sulfur chloride in the presence of a zinc salt catalyst in a molar ratio of 3 moles of xylene to one of sulfur chloride. The reaction is carried out at 76–82° C. The reaction mass is neutralized, liquid is decanted, xylene and water are removed, and the dry product is dissolved in kerosene. The xylene used in the reaction contains 30 ± 4% of the meta isomer. The xylene originally used is 3° xylene to which has been added recycled xylene recovered from the process. 3° xylene has the following representative composition:

| | Percent by weight |
|---|---|
| o-xylene | 10–14 |
| m-xylene | 62–68 |
| p-xylene | 10–14 |
| Ethylbenzene (max.) | 9 |
| Toluene (trace, percent) | <1 |

The m-xylene reacts faster than the other isomers. Table I shows the results of the flex testing.

TABLE I

| Runs: | Cycles to 0.1 inch cut growth ×10³ |
|---|---|
| A | 240 |
| B | 180 |
| C | 500 |
| D | 55 |
| E | 900 |
| F | 27 |

The preceding representative example may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A composition comprising (A) a sulfur-modified chloroprene polymer prepared by
   (1) polymerizing chloroprene in aqueous emulsion in the presence of per 100 parts by weight of monomer,
      (a) 0.25 to 0.45%, expressed as percentage of monomer weight, of sulfur, and
      (b) from 0.25 to 0.45%, expressed as percentage of monomer weight, of diethyl xanthogen disulfide or an amount of another dialkyl xanthogen disulfide in which the alkyl groups contain up to 8 carbon atoms and which gives an equivalent viscosity effect to the said amount of diethyl xanthogen disulfide; and
   (2) adding to the resulting latex at least 0.25 part, per 100 parts of polymer, of an antioxidant selected from the group consisting of N - phenyl - naphthylamine, N-phenyl-2-naphthylamine, N,N′-diphenyl-p-phenylenediamine, alkylated diphenylamines, p-isopropoxy-diphenylamine, di - 2-naphthyl-p-phenylenediamine, N-phenyl-N′-(p - toluenesulfonyl) - p - phenylenediamine, 2,2′-methylene-bis(6-tert-butyl-p-cresol), 2,2′- methylenebis(6-tert-butyl-4-ethylphenol), 4,4'-butylidenebis(6-tert-butyl-p-cresol), 2,2' - methylenebis[6-(1 - methyl-cylohexyl)-p-cresol], 2,6-di-tert-butyl-4-phenylphenol, 4,4' - thiobis(6-tert-butyl-m-cresol), 4,4'-thiobis(3,6-di-sec-amylphenol), 2,2'-thiobis(6-tert-butyl-p-cresol), 2,2'-thiobis(4,6-di-tert-butylphenol), 2,5 - di - tert - amylhydroquinone, 4-benzyloxyphenol, p-lauroylaminophenol, p-stearoylaminophenol, 2,6-di-tert-butyl-α-dimethylamino-p-cresol, 2,4,6-tris(3,5-di-tert-butyl-4-hydroxybenzylmesitylene and 2,4,6 - tris dimethylaminomethylphenol, and (B) 0.001 to 0.0046 mole, per 100 parts of polymer (A), of a diaryl disulfide having the formula

R—S—S—R' wherein R and R' are the same or different aromatic radicals and are selected from the group consisting of phenyl, tolyl, xylyl, naphthyl and 2-benzamidophenyl radicals.

2. The product of claim 1 wherein during the preparation the diaryl disulfide is added to the emulsion prior to isolation of the polymer.

3. The product of claim 2 which has been isolated and cured.

4. The product of claim 1 wherein the polymer is prepared by polymerizing a monomer emulsion containing up to 50%, by weight of total monomers, of another monomer, copolymerizable with the chloroprene, containing olefinic unsaturation and selected from the group consisting of styrene, vinyl toluenes, vinyl naphthalenes, acrylic and methacrylic acids, acrylic and methacrylic esters, acrylic and methacrylic nitriles, and conjugated diolefinic compounds.

5. The product of claim 1 which has been cured to give a polymer product of improved flex resistance.

References Cited

UNITED STATES PATENTS

| 3,216,967 | 11/1965 | Hawkins et al. | 260—45.9 |
| 3,322,717 | 5/1967 | Kendall | 260—45.9 |
| 3,329,645 | 7/1967 | Childen | 260—45.95 |
| 3,338,866 | 8/1967 | Spacht | 260—45.95 |
| 3,384,613 | 5/1968 | Parks | 260—45.95 |

FOREIGN PATENTS

| 1,035,387 | 7/1966 | Great Britain. |
| 1,044,847 | 10/1966 | Great Britain. |

HOSEA E. TAYLOR, Jr., Primary Examiner

U.S. Cl. X.R.

260—45.7, 45.95, 79.5, 92.3